United States Patent Office.

ANNA E. BALDWIN, OF NEWARK, NEW JERSEY.

Letters Patent No. 78,640, dated June 9, 1868.

IMPROVED PROCESS OF TREATING MILK TO OBTAIN USEFUL PRODUCTS.

*The Schedule referred to in these Letters Patent and making part of the same.*

TO ALL WHOM IT MAY CONCERN:

Be it known that I, ANNA E. BALDWIN, wife of GEORGE T. BALDWIN, of Newark, in the county of Essex, and State of New Jersey, have made a new and useful Improvement in Obtaining Useful Products from Milk; and I hereby declare the following to be a full and correct description of the same.

The object of my invention is to produce marrow from milk, and to utilize the waste in making butter, such as whey, curd, &c., in producing useful substances, viz, vinegar, cordial, soap, &c.

I place milk in pans, as is usually done, to raise cream. This cream is churned until a substance is produced, which, when properly washed and salted, becomes butter. Instead of churning the cream, I can extract the substance from the same by a process not necessary to describe in this specification, but for which I am about to apply for Letters Patent. I have discovered that this substance consists, in the greater part, of marrow, such as is found in the bones of animals, and which bone-marrow is used for making pomatum, ointments, and in a great many different ways, but which is comparatively very costly, but a small quantity being obtained from any animal.

I take this substance, and, instead of washing and salting it, place it in a vessel, with a sufficient quantity of water, heat the same to such a degree that the water shall thoroughly permeate all the fatty substance, and extract from the same all milky and other impure articles which remain in the same after churning. I then allow the mass to cool, when the pure marrow will be found on top, while the water and all impure particles remain at the bottom. This process of purification ought to be gone through with at least twice. The marrow is then again subjected to heat without adding any water, so that any water still remaining in the marrow will be evaporated. After cooling the marrow, it is well to beat or work it for a short time, as it thereby becomes finer in grain.

In taking the pure marrow from the vessel, it is unavoidable to leave some on the surface of the water, which is skimmed of the same, but, not being pure enough to be used for ointment, &c., makes an excellent grease for soap; and this is a very important part of my invention. The soap may be made by any of the well-known methods.

I will now describe another part of my invention.

I allow the milk, from which the cream is taken for the above process, to sour. The curd is then separated from the whey. The curd may be used for making cheese, for feeding, or any other purposes to which it can be applied.

By mixing the whey with a proper amount of brown sugar, and allowing it to ferment, an excellent cordial, or, at the pleasure of the operator, a good strong vinegar, is produced. To make the cordial, a greater quantity of sugar is required than for making vinegar. In the first case, I usually take one pound of sugar to six quarts of the whey, and for the vinegar, one pound of sugar to sixteen quarts of whey; but I desire it to be understood distinctly that I do not confine myself to any given quantities, as climate, temperature, &c., may necessitate different proportions.

The whey obtained in cheese-factories from the sweet milk, and which now is thrown away, can be made use of, in the above-described manner, to make vinegar, cordial, &c., thus changing the waste into a source of great profit.

Having thus described my invention, what I claim as new therein, and desire to secure by Letters Patent, is—

The improved methods of obtaining products from milk, substantially as and for the purposes herein described.

ANNA E. BALDWIN.

Witnesses:
GEO. T. BALDWIN,
ALEX'R A. C. KLAUCKE.